(12) United States Patent
Huang et al.

(10) Patent No.: US 10,252,171 B2
(45) Date of Patent: *Apr. 9, 2019

(54) SYSTEM AND METHOD FOR COOPERATIVE GAME CONTROL

(71) Applicant: Nvidia Corporation, Santa Clara, CA (US)

(72) Inventors: Jen-Hsun Huang, Santa Clara, CA (US); Spencer Huang, Santa Clara, CA (US); Madison Huang, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/043,689

(22) Filed: Feb. 15, 2016

(65) Prior Publication Data

US 2016/0287996 A1     Oct. 6, 2016

Related U.S. Application Data

(60) Provisional application No. 62/142,177, filed on Apr. 2, 2015.

(51) Int. Cl.
*A63F 9/24* (2006.01)
*A63F 13/847* (2014.01)
(Continued)

(52) U.S. Cl.
CPC .......... *A63F 13/847* (2014.09); *A63F 13/355* (2014.09); *A63F 13/40* (2014.09);
(Continued)

(58) Field of Classification Search
None
See application file for complete search history.

(56) References Cited

U.S. PATENT DOCUMENTS 7,497,776 B1 * 3/2009 Roman .................... A63F 13/12
463/31
8,490,012 B2 7/2013 Marinkovich et al.
(Continued)

OTHER PUBLICATIONS

Fu, Hsin-Chia, et al., "Interactive Video Platform for E-Learning and Remote Services," International Journal of Computer Science Issues, vol. 10, Issue 1, No. 1, Jan. 2013, 8 pages.

*Primary Examiner* — Paul A D'Agostino
(74) *Attorney, Agent, or Firm* — Kevin Brown; Parker Justiss, P.C.

(57) ABSTRACT

A system for cooperative game control. In one embodiment, the system includes: (1) a cloud game engine for executing game code configured to create a game, generate a video stream corresponding to a particular player and accept a response stream from the particular player to allow the particular player to play the game and (2) a cooperative play engine associated with the cloud game engine for communication therewith and configured to multicast the video stream from the cloud game engine to the particular player and at least one other player, combine separate response streams from the particular player and the at least one other player into a joint response stream and provide the joint response stream to the cloud game engine.

20 Claims, 3 Drawing Sheets

(51) Int. Cl.
*A63F 13/86* (2014.01)
*A63F 13/40* (2014.01)
*A63F 13/798* (2014.01)
*A63F 13/355* (2014.01)
*H04L 29/06* (2006.01)
*H04L 29/08* (2006.01)

(52) U.S. Cl.
CPC ............ *A63F 13/798* (2014.09); *A63F 13/86* (2014.09); *H04L 65/4076* (2013.01); *H04L 65/605* (2013.01); *H04L 67/10* (2013.01)

(56) References Cited

U.S. PATENT DOCUMENTS

| | | | |
|---|---|---|---|
| 9,158,746 B2 | 10/2015 | Bartek et al. | |
| 9,280,529 B2 | 3/2016 | Lemonik et al. | |
| 9,421,455 B1 | 8/2016 | Connor et al. | |
| 9,616,341 B2 | 4/2017 | Connor et al. | |
| 9,987,561 B2* | 6/2018 | Huang | A63F 13/847 |
| 2002/0169617 A1* | 11/2002 | Luisi | A63F 13/10 |
| | | | 704/275 |
| 2003/0199319 A1* | 10/2003 | Culbert | A63F 13/005 |
| | | | 463/42 |
| 2005/0227766 A1* | 10/2005 | Kaminagayoshi | A63F 13/10 |
| | | | 463/42 |
| 2005/0272505 A1* | 12/2005 | Okamura | A63F 13/10 |
| | | | 463/42 |
| 2006/0005240 A1* | 1/2006 | Sundarrajan | H04L 63/0272 |
| | | | 726/15 |
| 2006/0282774 A1 | 12/2006 | Covell et al. | |
| 2008/0158232 A1 | 7/2008 | Shuster | |
| 2009/0112906 A1 | 4/2009 | Shuster | |
| 2009/0249224 A1 | 10/2009 | Davis et al. | |
| 2010/0045697 A1 | 2/2010 | Reville et al. | |
| 2010/0138432 A1* | 6/2010 | Noyes | G06F 7/02 |
| | | | 707/758 |
| 2010/0142447 A1* | 6/2010 | Schlicht | H04W 4/20 |
| | | | 370/328 |
| 2010/0273553 A1 | 10/2010 | Zalewski | |
| 2010/0303444 A1* | 12/2010 | Sasaki | G11B 27/105 |
| | | | 386/248 |
| 2011/0022673 A1* | 1/2011 | Lueth | H04L 65/605 |
| | | | 709/206 |
| 2011/0078246 A1 | 3/2011 | Dittmer-Roche | |
| 2011/0086706 A1 | 4/2011 | Zalewski | |
| 2011/0122063 A1 | 5/2011 | Perlman et al. | |
| 2012/0102418 A1 | 4/2012 | Joy et al. | |
| 2012/0110443 A1 | 5/2012 | Lemonik et al. | |
| 2012/0184373 A1* | 7/2012 | Kim | H04L 65/4084 |
| | | | 463/42 |
| 2012/0252580 A1 | 10/2012 | Dugan | |
| 2012/0278731 A1 | 11/2012 | Marinkovich et al. | |
| 2013/0079132 A1 | 3/2013 | Archer et al. | |
| 2013/0084985 A1 | 4/2013 | Green et al. | |
| 2013/0106989 A1 | 5/2013 | Gage et al. | |
| 2013/0198273 A1 | 8/2013 | Vago et al. | |
| 2013/0244794 A1* | 9/2013 | Yahiro | A63F 13/10 |
| | | | 463/43 |
| 2013/0260892 A1* | 10/2013 | Ikeda | A63F 13/12 |
| | | | 463/42 |
| 2013/0339847 A1 | 12/2013 | Bartek et al. | |
| 2013/0344960 A1 | 12/2013 | Perry et al. | |
| 2014/0208163 A1 | 7/2014 | Domke et al. | |
| 2015/0067745 A1 | 3/2015 | Fear | |
| 2015/0080123 A1* | 3/2015 | Motokura | A63F 13/69 |
| | | | 463/31 |
| 2015/0157928 A1* | 6/2015 | Hall | A63F 13/795 |
| | | | 463/31 |
| 2015/0238859 A1 | 8/2015 | Fear | |
| 2015/0238875 A1 | 8/2015 | Fear | |
| 2015/0304605 A1* | 10/2015 | Hartman | H04N 7/15 |
| | | | 725/109 |
| 2015/0321098 A1* | 11/2015 | van der Laan | H04N 21/2143 |
| | | | 463/31 |
| 2015/0372845 A1* | 12/2015 | Yoshimochi | H04L 5/0091 |
| | | | 370/542 |
| 2015/0375117 A1* | 12/2015 | Thompson | A63F 13/35 |
| | | | 463/9 |
| 2016/0044073 A1 | 2/2016 | Rosenberg | |
| 2016/0158653 A1 | 6/2016 | Fear | |
| 2016/0170616 A1 | 6/2016 | Rosenbert | |
| 2016/0287988 A1 | 10/2016 | Huang et al. | |
| 2016/0294899 A1 | 10/2016 | Huang et al. | |
| 2016/0375363 A1 | 12/2016 | Connor et al. | |
| 2017/0080340 A1 | 3/2017 | Dugan | |

\* cited by examiner

SYSTEM AND METHOD FOR COOPERATIVE GAME CONTROL

CROSS-REFERENCE TO RELATED APPLICATION

This application is related to U.S. patent application Ser. No. 14/017,695, filed by Fear on Sep. 4, 2013, entitled "System and Method for Providing Real-Time Assistance Regarding a Cloud-Based Application," commonly assigned with this application and incorporated herein by reference. Further, this application claims the benefit of U.S. Provisional Patent Application Ser. No. 62/142,177, filed by Huang on Apr. 2, 2015, entitled "System and Method for Cooperative Game Control," commonly assigned with this application and incorporated herein by reference.

TECHNICAL FIELD

This application is directed, in general, to cloud computing and, more specifically, to a system and method for cooperative game control.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market. Desktop computers remain the highest performing personal computers available and are suitable for traditional businesses, individuals and gamers. However, as the utility of personal computing shifts from pure productivity to envelope media dissemination and gaming, and, more importantly, as media streaming and gaming form the leading edge of personal computing technology, a dichotomy develops between the processing demands for "everyday" computing and those for high-end gaming, or, more generally, for high-end graphics rendering in a multi-user, multi-scene environment.

The processing demands for high-end graphics rendering drive development of specialized hardware, such as graphics processing units (GPUs) and graphics processing systems (graphics cards). For many users, high-end graphics hardware would constitute a gross under-utilization of processing power. The rendering bandwidth of high-end graphics hardware is simply lost on traditional productivity applications and media streaming. Cloud graphics processing is a centralization of graphics rendering resources aimed at overcoming the developing misallocation.

In cloud architectures, similar to conventional media streaming, graphics content is stored, retrieved and rendered on a server where it is then encoded, packetized and transmitted over a network to a client associated with a user as a video stream (often including audio). The client simply decodes the video stream and displays the content. High-end graphics hardware is thereby obviated on the client end, which requires only the ability to play video. Graphics processing servers centralize high-end graphics hardware, enabling the pooling of graphics rendering resources where they can be allocated appropriately upon demand. Furthermore, cloud architectures pool storage, security and maintenance resources, which provide users easier access to more up-to-date content than can be had on traditional personal computers.

Perhaps the most compelling aspect of cloud architectures is the inherent cross-platform compatibility. The corollary to centralizing graphics processing is offloading large complex rendering tasks from client platforms. Graphics rendering is often carried out on specialized hardware executing proprietary procedures that are optimized for specific platforms running specific operating systems. Cloud architectures need only a thin-client application that can be easily portable to a variety of client platforms. This flexibility on the client side lends itself to content and service providers who can now reach the complete spectrum of personal computing consumers operating under a variety of hardware and network conditions.

SUMMARY

One aspect provides a system for cooperative game control. In one embodiment, the system includes: (1) a cloud game engine for executing game code configured to create a game, generate a video stream corresponding to a particular player and accept a response stream from the particular player to allow the particular player to play the game and (2) a cooperative play engine associated with the cloud game engine for communication therewith and configured to multicast the video stream from the cloud game engine to the particular player and at least one other player, combine separate response streams from the particular player and the at least one other player into a joint response stream and provide the joint response stream to the cloud game engine.

Another aspect provides a method of controlling a game cooperatively. In one embodiment, the method includes: (1) generating a video stream corresponding to a particular player of the game, (2) multicasting the video stream to the particular player and at least one other player and (3) combining separate response streams from the particular player and the at least one other player into a joint response stream, thereby causing the particular player and the at least one other player to play the game cooperatively.

Yet another aspect provides a cooperative play engine. In one embodiment, the cooperative play engine includes: (1) a video stream multicaster configured to receive from a cloud game engine a video stream corresponding to a particular player and multicast the video stream from the cloud game engine to the particular player and at least one other player and (2) a response stream combiner coupled to the video stream multicaster and configured to combine separate response streams from the particular player and the at least one other player into a joint response stream and provide the joint response stream to the cloud game engine.

BRIEF DESCRIPTION

Reference is now made to the following descriptions taken in conjunction with the accompanying drawings, in which.

DETAILED DESCRIPTION

Figure 1:
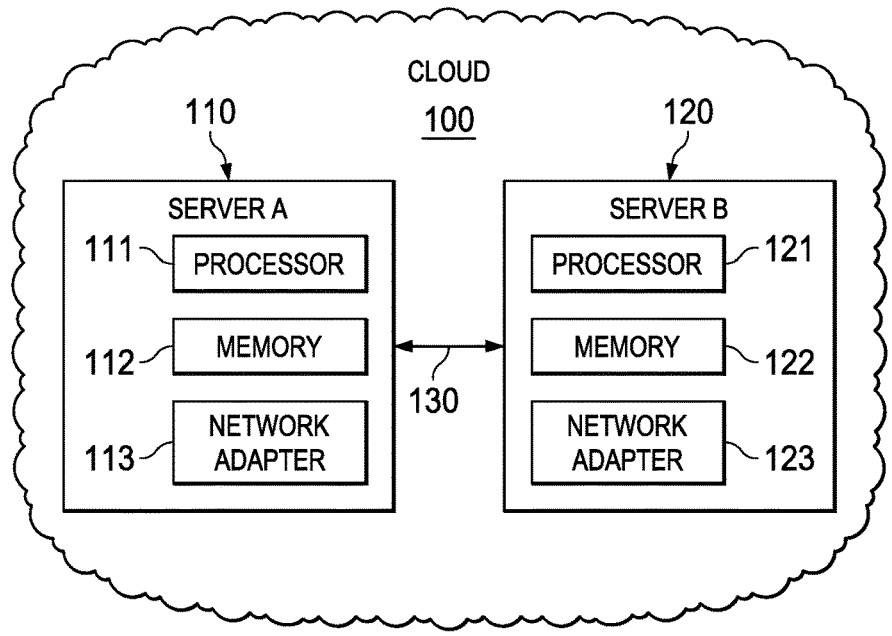
FIG. 1 is a diagram of one embodiment of a cloud of computing resources having processing and storage resources therein.

As the Background above implies, cloud-based applications are popular. Their popularity is likely to continue growing as Internet processing, storage and transport resources grow. Cloud-based games are particularly popular, because they can involve many players interacting with each other in real-time, enhancing their unpredictability and hence reality.

As those skilled in the art are aware, gaming often requires significant skill, acquired over time. In the case of single-player games, skill can be acquired at the expense of a somewhat diminished playtime or a lower score. Over time, however, the gamer acquires the desired skills, and the playtimes and scores improve.

Multi-player games are somewhat more problematic, however, as their players involved may play at widely disparate skill levels. Accordingly, a novice player may easily find himself surrounded by more experienced and capable foes. This can lead to frustratingly short playtimes and embarrassingly low scores. Ultimately, the novice player may take what in his mind is an unduly long time to acquire a desirable level of skill, perhaps discouraging him to the point of quitting. This is not a good outcome for a game manufacturer or a cloud gaming company, as commercial success is a direct function of the number of players.

It is realized herein that a gamer may benefit by being able to enlist the help of others. More specifically, it is realized herein that a player would benefit from actual gameplaying contributions of other players, as opposed to mere advice, perhaps delivered by a phone, across the room or over-the-shoulder. The term, "cooperative play," "cooperative gameplay," "cooperative gaming" or "cooperative game control" will be used synonymously to denote this concept.

"Cooperative play" is different from forming a team in a multi-player game and coordinating the team's activities. "Cooperative play" involves the cooperatively playing players viewing the same video stream and joint control of a single character or object in the game being played. From the perspective of the game, the cooperatively playing players are treated and appear as a single player.

It is further realized herein that existing, "legacy" games should be able to accommodate cooperative play without having to modify them. More specifically, it is further realized herein that cooperative play middleware may be employed to receive and multicast a video stream created by the game for a particular player. It is yet further realized herein that the cooperative play middleware can receive a response stream from each of the cooperatively playing players and create a joint response stream that appears to the game as though it originated in a single player.

A "video stream" is a series of frames of rendered video images, which may or may not include audio, designed to be delivered at a rate that causes a viewer to interpret them as conveying motion (i.e. at least 12 frames per second, and typically 18 frames per second or greater). "Cooperative play middleware" is software or firmware that mediates communication between a game and one or more cooperatively playing players. The cooperative play middleware may execute on a server in the cloud, resulting in a "cooperative play engine." A "game" is software or firmware that presents recreational or educational challenges that players wish to engage and surmount. The game may execute on a server in the cloud, resulting in a "cloud game engine." A "response stream" is a sequence of responses a player provides to a game, and the player may provide the responses by means of one or more input devices, e.g., button, mouse, switch, joystick, yoke or pedal. The sequence of responses may cause the player's character or object to act in a certain way, e.g., to run in a particular direction, turn a particular way, fly or land, pick up or drop an object, change modes of operation, fire or change weapons or pause, resume, restart or end the game. Responses and input devices vary about as widely as the games themselves.

It is yet further realized that the cooperative play middleware or engine may create a joint response stream from separate response streams in various ways. Several examples of ways in which a joint response stream may be created will be described below, with the understanding that those skilled in the pertinent art will, given the teachings and suggestions herein, devise other ways that yield embodiments that fall within the broad scope of the invention.

It is still further realized herein that the game may be a multi-player game, and that fewer than all of its players may be playing cooperatively. Those who are not playing cooperatively are said herein to be playing individually, which is the conventional way multi-player games are played.

Accordingly, introduced herein are various embodiments of a system and method for cooperative game control. The embodiments generally provide a way for gamers to come together to cooperate in the control of a single character or object in a game. Each of the cooperatively playing gamers receives the same video output from the game, and their separate responses are joined together in some way to yield a unified response to the game. Various embodiments will also be introduced for creating or ending cooperative play, adding or subtracting cooperative players and modifying the way in which separate response streams are joined. These and other embodiments will now be described in detail.

FIG. 1 is a diagram of one embodiment of a cloud 100 of computing resources, including processing and storage resources therein. As those skilled in the pertinent art understand, a "cloud" is an abstract term for a collection of networked processing and storage resources. The Internet represents perhaps the most significant example of a cloud. However, intranets, extranets or other physical or virtual networks may serve as clouds.

The cloud 100 embodiment of FIG. 1 is illustrated as including two servers: server A 110 and server B 120. Server A 110 takes the form of a computer and includes a processor 111, memory 112 and a network adapter 113. The processor 111 includes one or more central processing units (CPUs) (not shown) and often one or more co-processors, which may take the form of one or more graphics processing units (not shown). The memory 112 usually contains a mix of read-only memory (ROM) or other nonvolatile solid-state memory, volatile random-access memory (RAM) and one or more solid-state or hard drive storage units. Likewise, server B 120 takes the form of a computer and includes a processor 121, memory 122 and a network adapter 123.

Figure 2:
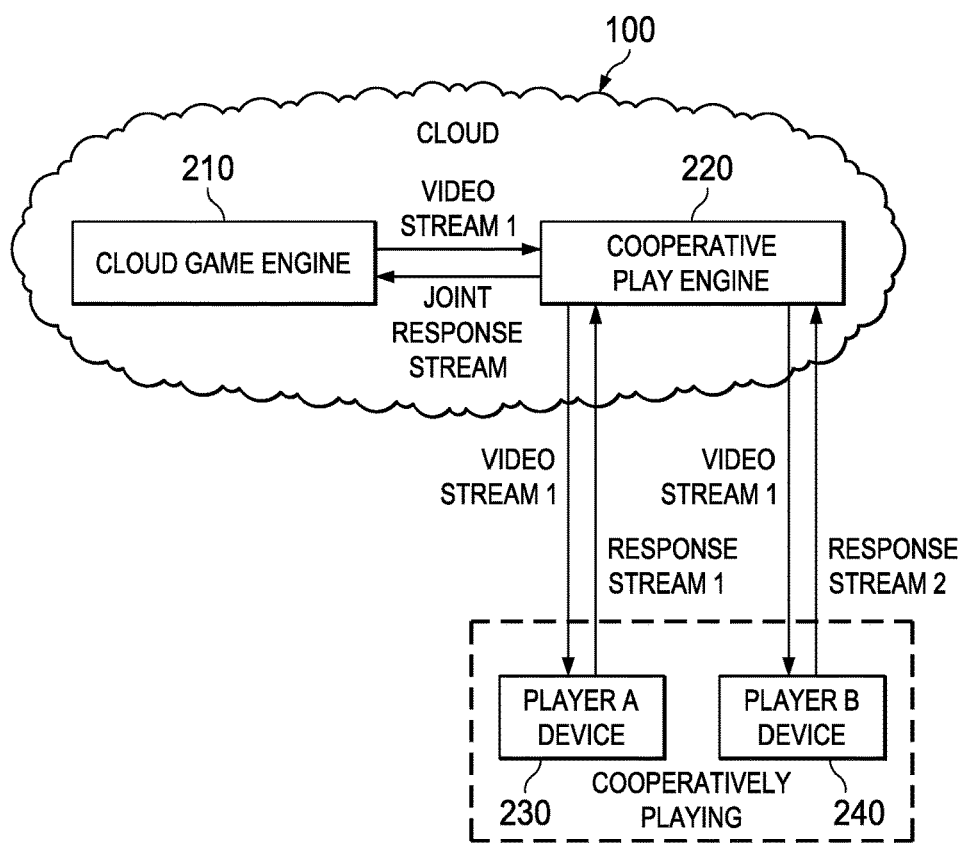
FIG. 2 is a diagram of one embodiment of the cloud of FIG. 1 having a cloud game engine and a cooperative play engine and capable of supporting cooperative game control.

FIG. 2 is a diagram of one embodiment of the cloud of FIG. 1 having a cloud game engine and a cooperative play engine and capable of supporting cooperative game control. The cloud 100 is illustrated as including a cloud game engine 210 and a cooperative play engine 220. In one embodiment, the cloud game engine 210 is embodied in the server A 110 of FIG. 1, and the cooperative play engine 220 is embodied in the server B 120 of FIG. 1. In another embodiment, the cloud game engine 210 and the cooperative play engine 220 are embodied in a single server. In yet another embodiment, one or both of the cloud game engine 210 and the cooperative play engine 220 are embodied in multiple servers.

In the embodiment of FIG. 2, the cloud game engine executes game code (not shown) that instantiates, or brings into existence, a game. The game is configured to generate a video stream 1 for a single player, player A, conveying a view of a gamespace in which player A can play the game. The game is also configured to receive a response stream from player A containing responses (commands or actions) that player A makes as player A plays the game.

However, as is introduced herein, player A wishes to enlist the help or cooperation of another person in playing the game. Player A does not wish to play against that person, but rather wishes that the other person cooperate with player A to control player A's character or object in the game to some degree or extent. That person agrees to cooperate, and thus will now be called "player B." In cooperative play, players A and B have separate devices, which may be computers, mobile devices, game controllers, terminals or the like. Accordingly, with reference to FIG. 2, player A is associated with a device 230, and player B is associated with a device 240.

Arrows in FIG. 2 denote the communication of data among the cloud game engine 210, the cooperative play engine 220, the device 230 and the device 240. As stated above, the cloud game engine 210 creates a video stream 1 for player A. The video stream 1 is received by the cooperative play engine 220. The cooperative play engine 220 then causes the video stream 1 to be multicast to both the device 230 (associated with player A) and the device 240 (associated with player B), as FIG. 2 illustrates.

Both player A and player B provide responses to the game based on the video stream 1, resulting in respective response stream 1 and response stream 2. As FIG. 2 also illustrates, the response stream 1 is transmitted by the device 230, and the response stream 2 is transmitted by the device 240. The cooperative play engine 220 receives both the response stream 1 and response stream 2, and combines the response stream 1 and response stream 2 to yield a joint response stream. As FIG. 2 illustrates, the cooperative play engine 220 transmits the joint response stream to the cloud game engine 210, which handles the joint response stream as though it were coming from a single player (namely player A).

Those skilled in the pertinent art will realize that the cloud game engine 210 need not be modified in any way to accommodate cooperative play. The cloud game engine 210 needs only to be instructed to transmit the video stream 1 to the cooperative play engine 220 and receive the joint response stream from the cooperative play engine 220. In this sense, the cooperative play engine 220 serves as a proxy for player A. It is readily apparent that the ability to enhance existing (legacy) games and game engines to accommodate cooperative play without requiring those games or game engines to be modified is a significant potential advantage in certain embodiments.

Figure 3:
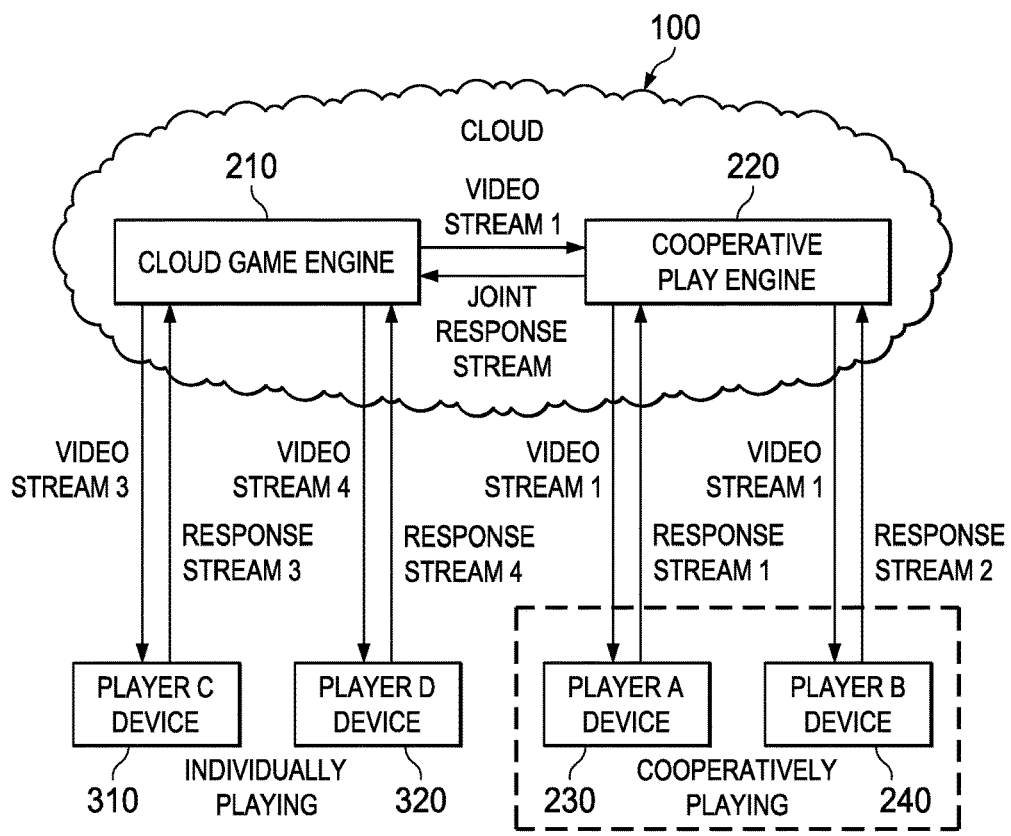
FIG. 3 is a diagram of one embodiment of the cloud of FIG. 1 or 2 having a multi-player-capable cloud game engine and a cooperative play engine and capable of supporting cooperative game control in the context of a multi-player game.

FIG. 3 is a diagram of one embodiment of the cloud of FIG. 1 or 2 having a multi-player-capable cloud game engine and a cooperative play engine and capable of supporting cooperative game control in the context of a multi-player game.

In the embodiment of FIG. 3, the cloud game engine executes game code (not shown) that instantiates, or brings into existence, a game. The game is configured to generate a video stream 1 for one player (player A in the example of FIG. 3), a video stream 3 for another player (player C in the example of FIG. 3) and a video stream 4 for yet another player (player D in the example of FIG. 3). Each of the video streams (1, 3 and 4) convey different views of a gamespace in which the respective players (A, C and D) can play the game. The game is also configured to receive response streams from players A, C and D containing responses (commands or actions) that players A, C and D make as they play the game.

However, as in the embodiment of FIG. 2, player A wishes to enlist the help or cooperation of another person in playing the game. Again, player A wishes that the other person cooperate with player A to control player A's character or object in the game to some degree or extent. That person agrees to cooperate, and, as before, will now be called "player B." Also as before, players A and B have separate devices 230, 240, respectively. Players C and D also have separate devices 310, 320, respectively, at which they receive video stream 3 and video stream 4, respectively, and from which they provide response stream 3 and response stream 4, respectively.

As in FIG. 2, arrows in FIG. 3 denote the communication of data among the cloud game engine 210, the cooperative play engine 220, the device 230, the device 240, the device 310 and the device 320. As stated above, the cloud game engine 210 creates a video stream 1 for player A. The video stream 1 is received by the cooperative play engine 220. The cooperative play engine 220 then causes the video stream 1 to be multicast to both the device 230 (associated with player A) and the device 240 (associated with player B).

Both player A and player B provide responses to the game based on the video stream 1, resulting in respective response stream 1 and response stream 2. As FIG. 2 also illustrates, the response stream 1 is transmitted by the device 230, and the response stream 2 is transmitted by the device 240. The cooperative play engine 220 receives both the response stream 1 and response stream 2, and combines the response stream 1 and response stream 2 to yield a joint response stream.

Concurrently, the cloud game engine 210 creates the video stream 3 for player C and the video stream 4 for player D. However, unlike the video stream 1, the cloud game engine 210 provides the video stream 3 directly to the device 310 and the video stream 4 to the device 320. Both player C and player D provide responses to the game based on the respective video stream 3 and video stream 4, resulting in respective response stream 3 and response stream 4. However, unlike the response stream 1 and the response stream 2, the device 310 and the device 320 provide the respective response stream 3 and response stream 4 directly to the cloud game engine. Thus, the cloud game engine treats player C and player D as distinct, individual players, while player A and player B appear as a single player.

Figure 4:
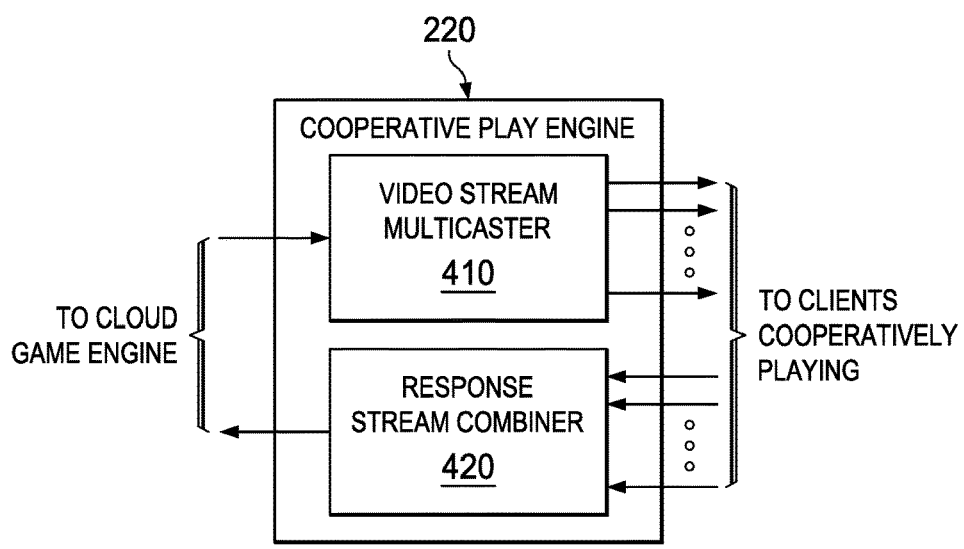
FIG. 4 is a block diagram of one embodiment of a cooperative play engine.

FIG. 4 is a block diagram of one embodiment of the cooperative play engine 220. The illustrated embodiment of the cooperative play engine 220 includes a video stream multicaster 410. The video stream multicaster 410 is configured to receive from a cloud game engine a video stream corresponding to a particular player and multicast the video stream from the cloud game engine to the particular player and at least one other player. Those skilled in the pertinent art understand that multicasting is known, and that conventional as well as later-developed multicasting techniques fall within the broad scope of the invention.

The illustrated embodiment of the cooperative play engine 220 further includes a response stream combiner 420. The response stream combiner 420 is coupled to the video stream multicaster 410 (in the sense that they cooperate with one another to effect cooperative play) and is configured to combine separate response streams from the particular player and the at least one other player into a joint response stream. The response stream combiner 420 is further configured to provide the joint response stream to the cloud game engine.

In one embodiment, the cooperative play engine 220 is configured to combine the separate response streams by interleaving the separate response streams. One example of such interleaving will now be given. In this example, the game allows a player to play through a character that can run. The character can be caused to run by displacing his joystick from its center, neutral position in a direction and to a magnitude that reflects the direction and magnitude at which he wants the character to run. Player A and player B, who are cooperatively playing through the character, use their respective joysticks to provide run responses that, typically together with other responses, are contained in their respective response streams, which are received by the response stream combiner 420 of the cooperative play engine 220. The response stream combiner 420 interleaves the run responses into a joint response stream by taking one run response from player A, then one run response by player B, then one run response from player A, and so on, until the all the run responses have been incorporated into the joint response stream.

In one embodiment, the cooperative play engine 220 is configured to combine the separate response streams based on times responses in the separate response streams are invoked. One example of such combining will now be given. In this example, the game allows a player to play through a character that can punch with its fist. The character can be caused to punch by pushing a button. Player A and player B, who are cooperatively playing through the character, use their respective buttons provide punch responses that, typically together with other responses, are contained in their respective response streams, which are received by the response stream combiner 420 of the cooperative play engine 220. The response stream combiner 420 combines the punch responses into a joint response stream by placing each punch response in the joint response stream as it is received from each of player A and player B. Thus, if the response stream from player A has three punch responses during a given period of time, and the response stream from player B has five punch responses during the same period of time, the joint response stream will contain eight punch responses during the same period of time.

In one embodiment, the cooperative play engine 220 is configured to assign windows of time to the particular player and the at least one other player and combine the separate response streams based on the windows of time. One example of such assigning and combining will now be given. In this example, the game allows a player to play through a character that can select a tool and use it to pop balloons. The character can be caused to select a tool (from a menu of tools) by pushing one button and pop balloons by pushing another button. Player A and player B, who are cooperatively playing through the character, use their respective buttons to provide run responses that, typically together with other responses, are contained in their respective response streams, which are received by the response stream combiner 420 of the cooperative play engine 220. The response stream combiner 420 assigns one-second intervals of time, first to player A, then to player B, then to player A, and so on. During player A's one-second interval, player A's tool-select and pop responses are incorporated into the joint response stream (and player B's tool-select and pop responses are ignored). Then, during player B's subsequent one-second interval, player B's tool-select and pop responses are incorporated into the joint response stream (and player A's tool-select and pop responses are ignored). Next, during player A's subsequent one-second interval, player A's tool-select and pop responses are incorporated into the joint response stream (and player B's tool-select and pop responses are ignored), and so on.

In one embodiment, the cooperative play engine 220 is configured to combine the separate response streams based on previously received responses in the separate response streams. An example of such combining will now be given. In this example, the game allows a player to play through an object, specifically a hot-air balloon, that can fly. The hot-air balloon can be caused to fly by pushing a button to fuel a flame that increase the temperature of the air in it. Player A and player B, who are cooperatively playing through the hot-air balloon, use their respective joysticks to provide fly responses that, typically together with other responses, are contained in their respective response streams, which are received by the response stream combiner 420 of the cooperative play engine 220. The response stream combiner 420 detects multiple fly responses in player A's response stream, but no fly responses in player B's response stream. Accordingly, the response stream combiner 420 places player A's fly responses into the joint response stream. If player B's response stream then begins to include fly responses, the response stream combiner 420 will ignore them until player A's response stream stops including fly responses for some interval, e.g., 0.5 second. At that time, the response stream combiner 420 will accept a fly response from either player A's or player B's response stream (to the exclusion of the other) until an interval again passes with no further fly responses. In this manner, either player A and player B can temporarily take over and actively control some response to the exclusion of the other player.

In one embodiment, the cooperative play engine 220 is configured to combine the separate response streams based on rankings of the particular player and the at least one other player. One example of such combining will now be given. Player A and player B each have a ranking with respect to a particular game, typically based on past scores. It is assumed for purposes of this example that player B has a higher rank, and is therefore ostensibly a more experienced player at the game in question, than player A. Player A and player B, who are cooperatively playing through a character, use their respective joysticks, buttons or other controls to provide responses that are contained in their respective response streams, which are received by the response stream combiner 420 of the cooperative play engine 220. The response stream combiner 420 combines the responses into a joint response stream by taking all the responses from player B, together with only those responses from player A that do not conflict with the responses from player B. Thus, if player A provides a run response in a direction that is substantially different from (above a deviation threshold from) a run response from player B, the run response from player A is ignored. On the other hand, if a run response from player A is in a direction that is substantially similar to (at most a deviation threshold from) a run response from player B, the run response from player A is combined in the joint response stream.

Those skilled in the pertinent art will understand that although only two cooperatively playing players have been described above, more players may be engaged in cooperative play in certain embodiments. Further, it should be apparent that many other embodiments exist for combining separate response streams into a joint response stream. These embodiments need not be static, either. They may change over time or differ according to a given character or object function.

Certain embodiments of the cooperative play engine 220 accommodate control functions that do not necessarily involve interaction with the cloud gaming engine 210. For example, a player (not shown) may interact with the cooperative play engine 220 to initiate a session of cooperative play, invite other players to join him in cooperative play, determine the way or ways in which the response stream combiner 420 may combine the various cooperative players' response streams into a joint response stream, disengage disruptive players from cooperative play, establish and conduct communication between or among cooperative players by text messaging or intercom or select a game to play. These are but a few examples.

Figure 5:
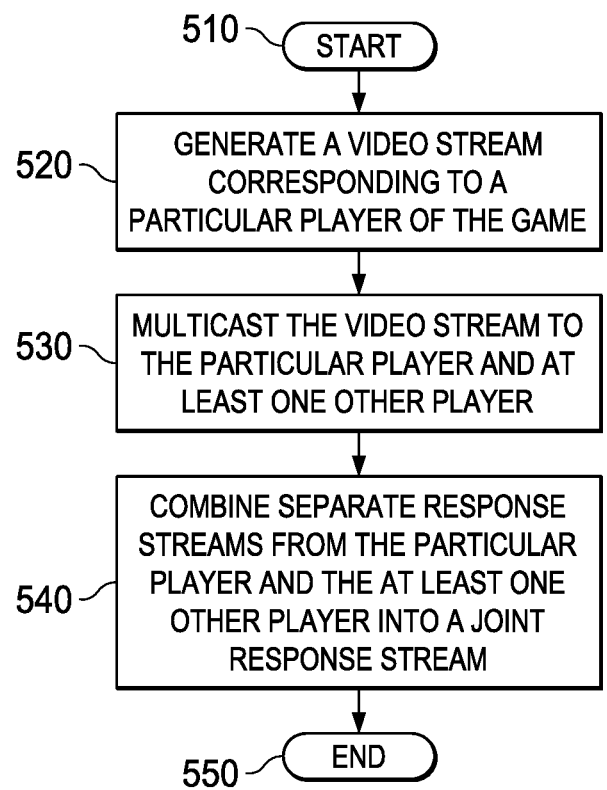
FIG. 5 is a flow diagram of one embodiment of a method of controlling a game cooperatively.

FIG. 5 is a flow diagram of one embodiment of a method of controlling a game cooperatively. The method begins in a start step 510. In a step 520, a video stream corresponding to a particular player of the game is generated. In a step 530, the video stream is multicast to the particular player and at least one other player. In a step 540, separate response streams from the particular player and the at least one other player are combined into a joint response stream. This causes the particular player and the at least one other player to play the game cooperatively. The method ends in an end step 550.

Those skilled in the art to which this application relates will appreciate that other and further additions, deletions, substitutions and modifications may be made to the described embodiments.

What is claimed is:

1. A system for cooperative game control, comprising:
a cloud game engine for executing game code configured to create a game, generate a video stream corresponding to a particular player and accept a response stream from said particular player to allow said particular player to play said game; and
a cooperative play engine associated with said cloud game engine for communication therewith and configured to multicast said video stream from said cloud game engine to said particular player and at least one other player, assign windows of time to said particular player and said at least one other player, combine separate response streams from said particular player and said at least one other player into a joint response stream based on said windows of time, and provide said joint response stream to said cloud game engine.

2. The system as recited in claim 1 wherein said game code requires no modifications to accept said joint response stream.

3. The system as recited in claim 1 wherein said game is a multi-player game and said video stream is one of a plurality of video streams for a corresponding plurality of players.

4. A method of controlling a game cooperatively, comprising:
generating a video stream corresponding to a particular player of said game;
multicasting said video stream to said particular player and at least one other player; and
combining separate response streams from said particular player and said at least one other player into a joint response stream based on previously received responses in said separate response streams, thereby causing said particular player and said at least one other player to play said game cooperatively.

5. The method as recited in claim 4 wherein game code carries out said generating, said game code requiring no modifications to accept said joint response stream.

6. The method as recited in claim 4 wherein said game is a multi-player game and said method further comprises generating a plurality of video streams for a corresponding plurality of players.

7. A cooperative play engine, comprising:
a video stream multicaster configured to receive from a cloud game engine a video stream corresponding to a particular player and multicast said video stream from said cloud game engine to said particular player and at least one other player; and
a response stream combiner coupled to said video stream multicaster and configured to combine separate response streams from said particular player and said at least one other player into a joint response stream based on rankings of said particular player and said at least one other player, and provide said joint response stream to said cloud game engine.

8. The engine as recited in claim 7 wherein said cloud game engine includes game code that creates said video stream and said game code requires no modifications to accept said joint response stream.

9. A system for cooperative game control, comprising:
a cloud game engine for executing game code configured to create a game, generate a video stream corresponding to a particular player and accept a response stream from said particular player to allow said particular player to play said game; and
a cooperative play engine associated with said cloud game engine for communication therewith and configured to multicast said video stream from said cloud game engine to said particular player and at least one other player, combine separate response streams from said particular player and said at least one other player based on previously received responses in said separate response streams into a joint response stream, and provide said joint response stream to said cloud game engine.

10. A system for cooperative game control, comprising:
a cloud game engine for executing game code configured to create a game, generate a video stream corresponding to a particular player and accept a response stream from said particular player to allow said particular player to play said game; and
a cooperative play engine associated with said cloud game engine for communication therewith and configured to multicast said video stream from said cloud game engine to said particular player and at least one other player, combine, based on rankings of said particular player and said at least one other player, separate response streams from said particular player and said at least one other player into a joint response stream, and provide said joint response stream to said cloud game engine.

11. A method of controlling a game cooperatively, comprising:
generating a video stream corresponding to a particular player of said game;
multicasting said video stream to said particular player and at least one other player;
assigning windows of time to said particular player and said at least one other player; and
combining, based on said windows of time, separate response streams from said particular player and said at least one other player into a joint response stream, thereby causing said particular player and said at least one other player to play said game cooperatively.

12. A method of controlling a game cooperatively, comprising:
generating a video stream corresponding to a particular player of said game;
multicasting said video stream to said particular player and at least one other player; and
combining, based on rankings of said particular player and said at least one other player, separate response streams from said particular player and said at least one other player into a joint response stream, thereby causing said particular player and said at least one other player to play said game cooperatively.

13. A cooperative play engine, comprising:
a video stream multicaster configured to receive from a cloud game engine a video stream corresponding to a particular player and multicast said video stream from said cloud game engine to said particular player and at least one other player; and
a response stream combiner coupled to said video stream multicaster and configured to assign windows of time to said particular player and said at least one other player, combine separate response streams from said particular player and said at least one other player into a joint response stream based on said windows of time, and provide said joint response stream to said cloud game engine.

14. A cooperative play engine, comprising:
a video stream multicaster configured to receive from a cloud game engine a video stream corresponding to a particular player and multicast said video stream from said cloud game engine to said particular player and at least one other player; and
a response stream combiner coupled to said video stream multicaster and configured to combine separate response streams from said particular player and said at least one other player into a joint response stream based on previously received responses in said separate response streams, and provide said joint response stream to said cloud game engine.

15. The engine as recited in claim 7 wherein said cloud game engine includes game code that creates a multi-player game and said video stream is one of a plurality of video streams for a corresponding plurality of players.

16. The system as recited in claim 9 wherein said game is a multi-player game and said video stream is one of a plurality of video streams for a corresponding plurality of players.

17. The system as recited in claim 10 wherein said game is a multi-player game and said video stream is one of a plurality of video streams for a corresponding plurality of players.

18. The method as recited in claim 11 wherein said game is a multi-player game and said method further comprises generating a plurality of video streams for a corresponding plurality of players.

19. The method as recited in claim 12 wherein said game is a multi-player game and said method further comprises generating a plurality of video streams for a corresponding plurality of players.

20. The engine as recited in claim 13 wherein said cloud game engine includes game code that creates a multi-player game and said video stream is one of a plurality of video streams for a corresponding plurality of players.

* * * * *